Jan. 20, 1942.　　　　J. MILLS ET AL　　　　2,270,327
METHOD AND APPARATUS FOR COOKING FOODS
Filed Feb. 3, 1938　　　3 Sheets-Sheet 3
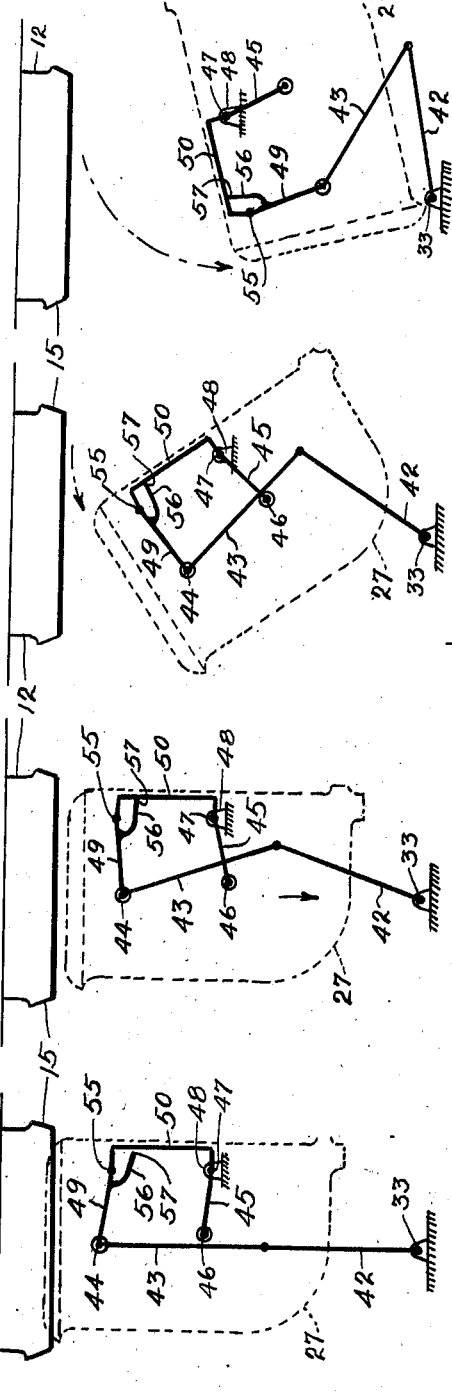
INVENTORS
JOHN MILLS.
CHARLES W. LANG.
BY Richey Watts
ATTORNEY.

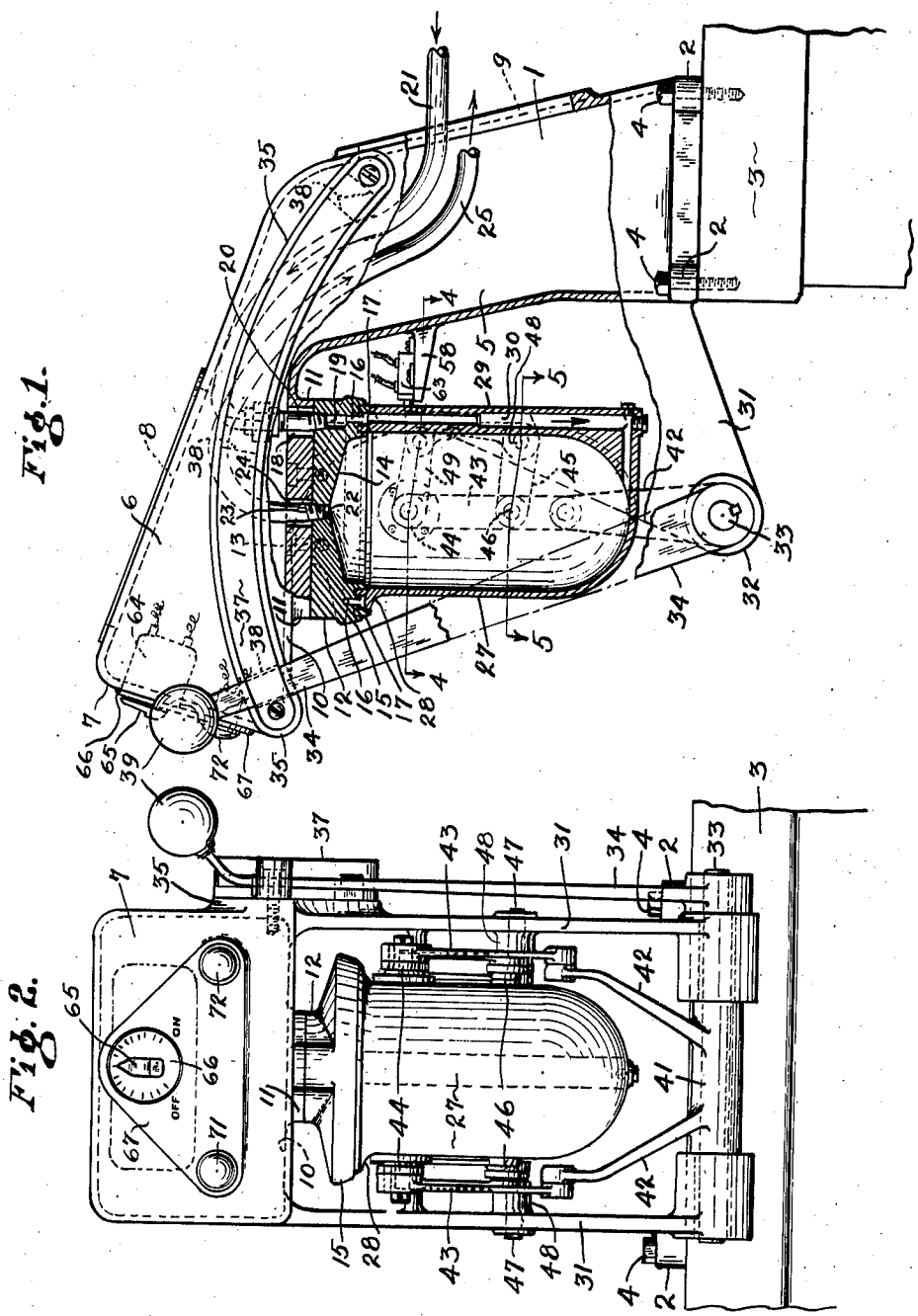

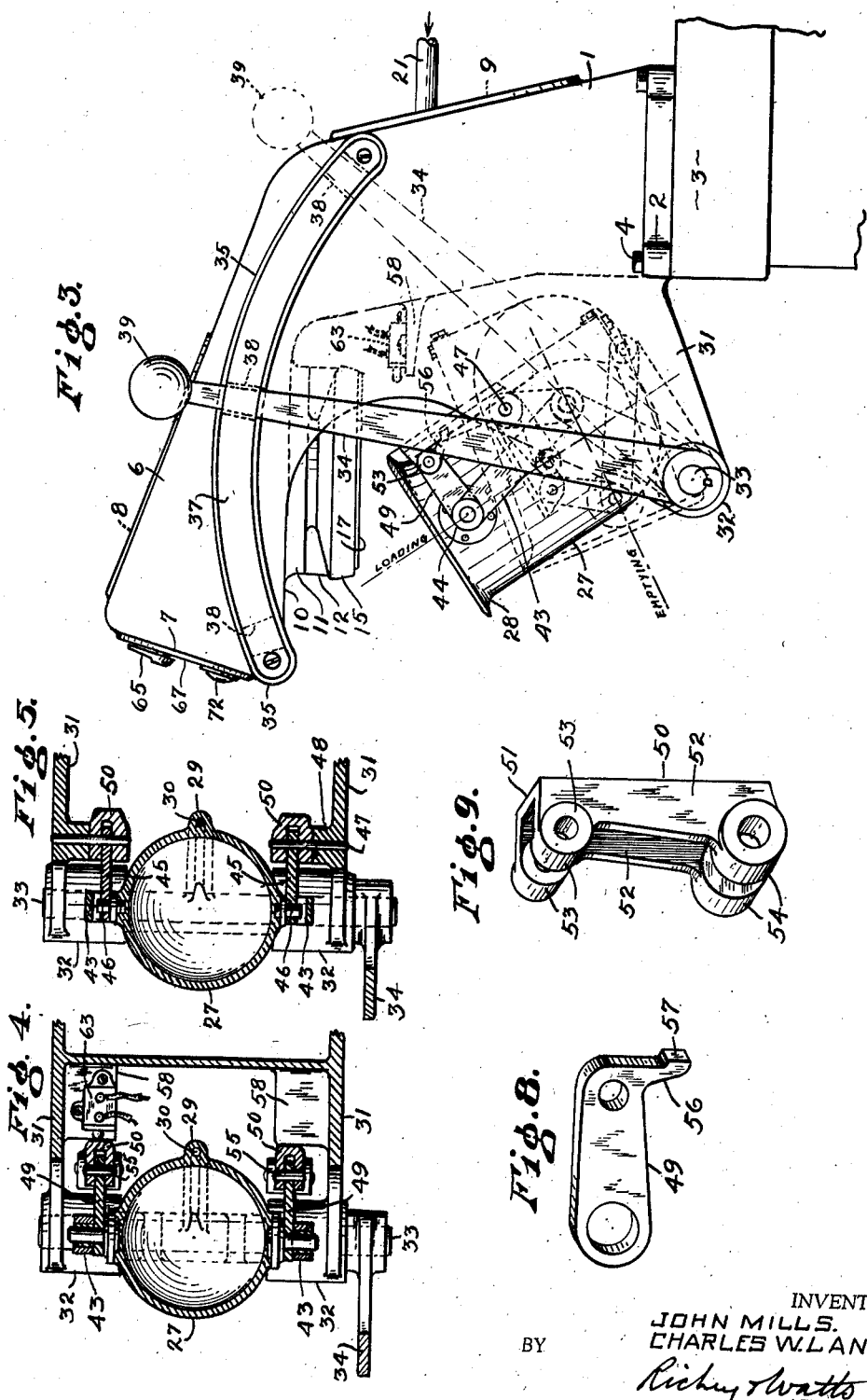

Patented Jan. 20, 1942

2,270,327

UNITED STATES PATENT OFFICE 2,270,327

METHOD AND APPARATUS FOR COOKING FOODS

John Mills and Charles W. Lang, Philadelphia, Pa.

Application February 3, 1938, Serial No. 188,590

9 Claims. (Cl. 53—15)

This invention relates to improvements in methods and apparatus for cooking foods, and more particularly to a method and apparatus for preparing foods by subjecting the same to live steam.

Although foods have heretofore been cooked by subjecting the same to steam there have been many disadvantages present in the prior devices which it is the object of the present invention to overcome. The prior devices were usually large and cumbersome apparatus which were only adapted for cooking food in large quantities. So far as we are aware, no one prior to our invention has provided cookers for the commercial cooking of food such as is contemplated by the present invention. Particularly were they not adaptable to cook small quantities of foods with any degree of efficiency. Foods after having been cooked in the prior devices had to be stored in so-called steam tables prior to their consumption, which had numerous disadvantages. Primarily foods cooked in such large quantities and thus stored, lose their more delicate flavor and either become strong and odiferous, or lose their individuality of flavor entirely as well as their food value. Many foods such as cauliflower for instance should be consumed immediately after cooking because of the foregoing reasons. Still another disadvantage of the prior cookers resides in the waste of food which naturally increases the overhead cost. It is a practical impossibility in restaurants to determine with any degree of exactness what quantity of a certain type of food will be consumed at any one meal, with the result that often the quantity of food prepared is insufficient to meet the demand, or the demand is not sufficient to consume the food. In the first event the customer is disappointed because he cannot obtain the particular food he wants, and in the second event the restaurant is in the position of having a quantity of food left over. In order to serve foods freshly cooked they must be cooked in small quantities. Cooking in such small quantities has its disadvantages because the customer cannot ordinarily wait for the individual portions to be cooked to his order. Furthermore the cost of cooking such individual portions of food so increased the overhead as to make the price more than the customer ordinarily cared to pay.

By the present invention the cumbersome cooking apparatus of the prior art are eliminated, and the odiferous steam table may be dispensed with. The customer may come into the restaurant and order his various items of food and each of the items is cooked in an individual cooker at a high rate of speed heretofore impossible to obtain. The items are then served directly to the consumer, fresh cooked and retaining all of the original flavor and food value. Inasmuch as the items of food are in such small quantities it will be realized that the time necessary for cooking the same is considerably shortened and that further, due to the construction of the mechanism embodying this invention, considerably higher pressure and hence hotter steam may be used which also serves to decrease the cooking time. Furthermore, since no water need be used, none of the juices or food value is lost.

In actual practice the vessel of our invention which cooks the food may be quickly and easily loaded and discharged. Suitable timing and indicating mechanism may be employed so that the food, after being placed in a vessel, is automatically cooked for the correct predetermined cooking interval and without further attention. When the cooking interval is finished the cooking is automatically terminated, causing a visible and/or aural signal to be operated, indicating that the food is ready to be served.

The mechanism is such that the possibility of accidental burns from steam is eliminated. The apparatus is extremely light and also very compact, making it possible to organize in a relatively small space a considerable battery of cookers without any of the waste space ordinarily taken up by prior art devices. The hazards from burns due to open flames as from gas or coal, boiling water and the like, are eliminated and the fuel consumed is relatively small.

Still other advantages of the invention and the invention itself will become more apparent from the following description of an embodiment thereof, which description is illustrated by the accompanying drawings.

In the drawings:

Fig. 1 is a side view of one of the cooking units partly in elevation and partly in section, and showing the same in the position wherein cooking is taking place;

Fig. 2 is a front elevational view thereof;

Fig. 3 is a side elevational view, the unit of Fig. 1 showing the cooking receptacle tilted for the loading position and showing in dotted lines the position taken for discharging the same;

Figs. 4 and 5 are sectional views taken on the lines 4—4 and 5—5 respectively of Fig. 1;

Fig. 6 is a diagrammatic view showing an electrical control circuit for one of the units;

Figs. 7a, 7b, 7c, and 7d are diagrammatic views showing the operation of the tilting mechanism in (7a) cooking, (7b) start of discharge, (7c) loading or predischarge, and (7d) discharge position;

Fig. 8 is a perspective view of one of the control links used in the tilting mechanism; and Fig. 9 is a perspective view of another control link adapted to cooperate with the link of Fig. 8 to control the tilting of the vessel.

Referring now to the drawings, like parts have been designated by like reference characters.

Considered generally the apparatus includes a support which carries a head or manifold to which steam inlet and exhaust lines lead. The support is provided with a control panel which carries the indicator lights, and also the timing mechanism. Valves are provided for the steam lines and are in turn controlled by the timing mechanism. A pot or vessel is suspended below the head in such a manner and by a suitable linkage so that by operating a lever the pot is brought into fluid sealing contact with the head or may be dropped down from the head and tilted to any desired angle through 120° to load or discharge the same. Steam from the head is conducted into the pot through the bottom and in the preliminary stage of cooking exhausts through the exhaust. After the preliminary stage, the exhaust valve is closed and the pressure built up in the container to cook the food. After cooking, the steam is automatically turned off and that in the vessel discharged to atmosphere; the food may then be discharged from the vessel in substantially the same manner in which the vessel was loaded.

More specifically the device includes a support in the form of a hollow housing or frame 1 adapted to be secured to a counter or pedestal 3 by stud bolts 4 which extend through laterally extending ears 2. The housing includes an upstanding portion 5 and a forward extending or overhanging portion 6, the end 7 of which is provided with an inclined panel which carries a timer control and indicating lights later to be described. Access to the interior of the housing for making the various connections may be had through openings 8 and 9 in the base and top respectively.

The overhanging portion 6 has a bottom wall 10 disposed in a horizontal plane and which is formed with a downwardly extending boss 11. A head or manifold 12 is provided and is secured to the boss 11 by studs 13. This head has a dished or concave inner surface 14 and carries a downwardly extending annular flange 15 extending around the head adjacent its periphery. The flange is formed with an upwardly extending annular channel 16 and in spaced relation, on each side of the channel, are ring gaskets 17 seated in grooves concentric to the channel and which gaskets provide a sealing means with the upper end of a pot or vessel hereinafter described.

An opening 18 is provided through the boss 11 in communication with a threaded duct 19 of the head into which duct is screw-threaded a nipple 20 which is connected by a union to an inlet pipe 21. The duct 19 communicates with the channel 16. An outlet opening is provided for the head and comprises an outlet duct 22 at the apex of the head into which a nipple 23 is threaded, an opening 24 being provided in the boss 11. The nipple is connected to an exhaust pipe 25.

A cooking pot or vessel 27 is supported below the head in such a manner that it may be held in operative connection with the head or removed from such connection and tipped or tilted to facilitate loading and/or unloading the same. The vessel 27 comprises a relatively thick walled deep pot as best shown in Fig. 1, the upper edge of which is formed with an annular lip 28, the upper surface of the lip being rounded. The body is generally cylindrical in form except for thickened portion 29 of the wall at the back, which portion extends from the top edge downward to the bottom. A duct 30 is provided in the wall 29 and communicates through the edge of the lip with the channel 16; said duct extends downward through the thickened portion 29 and thence laterally along the bottom, opening into the bottom of the vessel near the center.

The upstanding part 5 of the housing is provided with a pair of forwardly and downwardly extending parallel wings 31 which have axially aligned bosses 32 at their lower extremity, providing bearings for a rotatably mounted rock shaft 33. One end of the shaft 33 protrudes outward from the bearing 32 and has secured thereon, an operating lever 34. The upper end 6 of the housing at one side is provided with a raised arcuate portion or boss 35 which extends from the lower end of the front panel to the rear of the housing; this raised portion supports a quadrant 37, the quadrant being secured to the boss by screws. The ends of the quadrant where the screws pass through are thickened to space the intermediate portion of the quadrant from the boss on the housing. The inner face of the quadrant opposite the raised portion 35 is provided with spaced notches 38 for selective engagement with the lever 34. The lever 34 is made of resilient material and extends upward, between the raised portion 35 and the quadrant, terminating in a handle 39. The lever is normally pressed outward against the quadrant thus causing the lever adjacent the handle to be engaged in the notches 38, locking the handle against movement in certain predetermined positions.

Means for supporting and moving the vessel is provided and comprises a toggle for initiating the movement and guide links for controlling the movement. A yoke 41 is secured to the rock shaft 33 and has arms 42 extending upwardly and divergingly, terminating on opposite sides of the vessel. Pivotally connected to the ends of the arms 42 are links 43, the ends of which are rotatably journalled on trunnions 44 extending outwardly from the vessel on opposite sides thereof adjacent to but spaced from the top. The vessel is thus supported by the yoke 41 and links 43 which comprise the toggle linkage.

The guiding or control linkage serves to control the movement of the vessel when the toggle linkage is straightened or bent. The preferred movement of the vessel should be such that it is first lowered free from engagement with the head and then tilted forwardly (Fig. 3), the degree of tilting being determined according to whether the vessel is to be loaded or emptied. The control linkage includes a pair of tie links 45 having their one ends connected to trunnions 46 on opposite sides of the vessel below and spaced from the trunnions 44 but in vertical alignment therewith, the other ends of the links being journalled on pins 47 secured in diametrically oppositely disposed bosses 48 on the inner surface of the wings 31 (Figs. 2 and 5).

These links limit the radius of movement of the vessel confining the movement of the vessel at the trunnions 46 to the arc that may be described by the trunnion ends of the links 45 about the pin 47. A second guide linkage is provided which cooperates with the tie links to cause the movement hereinbefore mentioned and comprises a pair of links 49 (Fig. 8) journalled on the trunnions 44 between the links 43 and the body of the vessel and extending rearwardly and pivotally connected to the ends of a second pair of links 50. Each of the links 50 (Fig. 9) comprises a channel-shaped member including a back-wall 51 and a pair of parallel extending side walls 52, the upper and lower extremities of the side walls being provided with bosses 53 and 54 respectively. The end of each link 49 is rotatably journalled on a pin 55 between the bosses 53 of the link 50. Movement of the link 49 about the pin 55 in the link 50 is limited by a downwardly extending foot 56 integral with the end of the link 49, which foot extends between the side walls of the link and is provided with a toe 57 adapted upon predetermined movement of the link about the pivot pin 55 to contact and engage the back-wall 51. The toe 57 which furnishes the contact may be ground off to definitely predetermine the amount of rotation of the link 49 prior to engagement thereof with the back-wall of the link 50. The other ends of the links 50 are journalled on the pintles 47 with the bosses 54 on either side of guide links 45.

The housing 1 is also provided with a pair of stops 58 (Figs. 1 and 4) which extend forward from the front of the housing under the overhanging portion. The bosses are integral with the housing and wings 31 on opposite sides and are so disposed as to engage and limit movement toward the housing of the links 50.

A description of the operation of the tilting mechanism at this point will facilitate an understanding thereof, which operation is as follows.

The lever 34, as viewed in Figs. 1 and 2, is moved sidewise by the handle 39 toward the vessel to disengage the same from the notches 38, it being assumed that the operator is standing in front of the apparatus as viewed in Fig. 2. The lever is then moved toward the rear or away from the operator to the position shown in Fig. 3. Movement of the lever is transmitted to the yoke 41 which rotates the yoke and arms 42 clockwise as viewed in Fig. 3 bending the toggle linkage. This causes the vessel to move straight downward, the movement being a straight line movement caused by bending the toggle linkage comprising the arms 42 and links 43 (Figs. 7a and 7b). This downward movement of the vessel first rotates the guide link 49 about the pin 55 in the upper end of the link 50 until the toe 57 engages the back-wall 51 of the link 50 preventing further relative movement of the links 49 and 50 (Fig. 7b).

Further continued movement of the lever 34 bending the toggle linkage 42—43 causes the links 50 and 49, now immovable relative to each other, to pivot about the pin 47 as a unit guiding the vessel and causing the upper end to rotate forward into the position shown in Figs. 3 and 7c. At this position the lever 34 engages in the intermediate of the notches 38 in the quadrant, locking the mechanism in the position shown in Fig. 3. The tie links 45 hold the bottom of the vessel from swinging outward, furnishing in effect a trunnion for the vessel, movable in an arc. This position of the vessel may be considered as the loading position and causes the vessel to be tilted sufficient to permit ready access thereto for charging the vessel with the material to be treated. If it should be desired to discharge the material after treatment, the lever 34 is merely held pressed toward the left, the same as for initiating movement preventing the lever from engaging the intermediate notch 38 and at the same time rotated to the rearmost position shown by the dotted lines in Fig. 3. This movement merely continues the movement last described for the intermediate or loading position, causing the vessel to revolve to a position where the upper edge or open part of the vessel is lower than the bottom whereby the material is discharged. As previously stated, the link 45 tieing the vessel to the frame below the center line, prevents the bottom of the vessel from swinging downwardly and causes the trunnions 46 to rotate about the pin 47 (note particularly Figs. 7a to 7d inclusive.)

Continuing the explanation as from the loading position: when the handle is returned to its original position, toward the operator, the toggle linkage is straightened and the vessel is then rotated, first to a vertical position in a manner exactly opposite to that just described, until the link 50 engages the stop 58 preventing further rotation of the vessel, which is now vertical, the weight of the vessel causing the linkage 49 and 50 to be immovable relative to each other.

When the vessel reaches a vertical position, the outer surface of the back-walls 51 of the links 50 engage the bosses or abutments 58 preventing further rotation of the vessel; further straightening of the toggle linkage 42—43 is translated into a straight line vertical movement which raises the vessel into sealing engagement with the head. The gaskets 17 in the head engage the lip 28 on the vessel and the channel 16 is thus in communication with the duct 30.

The manner of controlling the feeding of the treating fluid to the vessel may be varied and will be determined by the manner in which the apparatus is to be operated for the treating of materials. For the purpose of explanation, however, it will be assumed that the apparatus is to be used for cooking a particular type of vegetable although its use is obviously not limited merely to food cooking. Although the controls about to be described illustrate one method of using the apparatus, it will be obvious that timing and arrangement of the auxiliary apparatus may be varied for the treating of different materials.

Briefly, one method of operating the apparatus would consist in loading the vessel; then placing the lever to the operating position (Fig. 1), sealing the vessel with the head. Steam is then admitted through the bottom of the vessel causing the air to be forced out through the exhaust and preliminarily heating its contents. After forcing out the air the exhaust may be closed and the steam pressure allowed to build up in the vessel to the desired pressure, say forty pounds. A light on the front panel of the overhanging portion indicates that the steam is on and an adjustable timer may be provided to control the length of the cooking period, which period having elapsed, the timer automatically shuts off the steam allowing the steam in the vessel to exhaust to atmosphere and lights a second light, warning the operator that the cooking period has ceased. The contents may then be discharged at the will of the operator and are ready for consumption.

More specifically the operation and auxiliary apparatus necessary to accomplish the foregoing is as follows:

Valves 61 and 62, Figure 6, are interposed in the inlet and outlet pipes 21 and 25. These valves may, if desirable, be disposed in the housing 1. Control means for the valves may comprise an electric motor M which rotates a pair of levers, which levers in turn are connected to the valves. Motion from the motor to the levers may be through a suitable train of gears; inasmuch as many such mechanisms are common and available on the market today the motor and lever mechanism per se forms no part of the present invention except in the combination shown and described. The levers of the motor are preferably operable through 180° of rotation and when rotated in one direction, close the exhaust valve and open the intake valve. Operable in the other direction, they close the intake and open the exhaust. A safety switch 63 is provided mounted on one of the abutments 58. When the link 50 is in the upright position with the pot in engagement with the head, the circuit from the main line is closed by the back of the link engaging the switch (Fig. 6). Before the timing mechanism is set but when the device is ready to operate, the exhaust valve is open and the intake valve is closed. The timer 64 is set by the lever 65 on the dial 66 located on the panel 67 for the desired number of minutes. As soon as the timer is set the switch 69 is opened and the motor M is energized through the time switch 65—66. The steam valve is then opened to admit steam which rushes in through the inlet duct in the head and the duct into the bottom of the pot, forcing the air out of the pot through the exhaust valve 62. The valves may be arranged so that the exhaust valve does not close when the inlet valve is first opened but remains open through the means of a lost motion connection, not shown, until the motor has nearly finished its rotation of the lever arms. Steam is thus circulated through the food until the motor is automatically stopped in a well known manner. Just prior to the cessation of movement of the motor, the exhaust valve is closed. The steam inlet valve remains open and pressure within the vessel is built up to a predetermined number of pounds which may be controlled by a suitable pressure regulator, not shown, disposed in the steam inlet line. The pressure for cooking may be predetermined and may vary between ten and approximately forty pounds. When the food is then cooking under pressure, a mercury switch 70 controlled by the connection to the motor and which comprises a single pole double throw switch closes the circuit from the main circuit to the red light 71 on the panel 67 indicating that the steam is on and that cooking is in process. The timer may be a spring return mechanism which automatically returns the lever 65 to the starting position after the predetermining interval to which it has been set has elapsed. These types of timers are well known and may be any recognized design. As soon as the predetermined time interval has elapsed, the switch 65—66 is opened and the switch 69 automatically closed by the timer, restarting the motor M and reversing the rotation of the arms, closing the intake and opening the exhaust valve and permitting the steam in the vessel to escape to atmosphere. One type of motor M particularly useful in accomplishing this purpose is a low voltage motor operated in one direction by closing of the switch 65—66 which causes the motor to rotate the arms until the motor is stopped by being stalled due to a stop operatively connected with the gear train. When this motor is stalled, the current continues to keep the motor energized, thus holding the valves in their proper position for the food cooking, and when the circuit is de-energized by opening of the switch 65—66, a spring returns the motor and gearing to its starting position. These motors are commonly known as split phase induction, torque, or stalled type motors. The mercury switch 70 assumes a different position which energizes the circuit to the green light 72 on the panel indicating that the cooking period is completed. The steam pressure being off, food is now ready to be discharged from the vessel for consumption.

Having thus described the invention we are aware that numerous and extensive departures may be made therefrom without departing from the spirit of the invention or the scope of the appended claims.

We claim:

1. In a device of the class described, a support, a head carried by the support and a source of steam connected thereto, a vessel, an operating lever and a yoke carried by the support and a linkage connected to the yoke and vessel and operable by the yoke and lever to engage the vessel with the head and to lower the vessel from the head and to tilt the vessel to discharge its contents.

2. In a device of the class described, a head, inlet and outlet ducts for said head, a vessel movable into engagement with said head and formed with a duct adapted to be in fluid connection with the inlet duct in said head and to conduct fluid into the vessel at a point remote from the head, and means for moving the vessel into and out of engagement with said head.

3. In a device of the class described, a support, a head carried by said support, fluid inlet and outlet ducts for said head, valve means for controlling fluid flow through said ducts, a vessel for containing a material to be treated by said fluid and means connected to said support and said vessel for moving said vessel into and out of operative relation with said head and to tilt said vessel for charging and discharging the contents thereof including a toggle linkage connected to the support and vessel and a guiding linkage connected to the support and vessel.

4. In a device of the class described, a support, a head carried by the support and a source of steam connected to said head, a vessel, a toggle linkage connected to the support and vessel, and a tie link connected to the support and vessel, said toggle linkage and tie link adapted to support the vessel, said toggle linkage adapted to move the vessel to and from said head, a second pair of links connected to each other and to the vessel and support and operable upon movement of the toggle linkage to control the movement of said vessel.

5. In a device of the class described, a support and a head carried thereby, a vessel, means for moving said vessel to and from said head including a toggle linkage pivotally connected at its ends to the support and vessel, a lever operatively connected to said linkage at the support end for straightening and bending the same, a guide linkage connected to the support and to the vessel below the point of connection of the toggle linkage, a second guide linkage comprising a link connected to the support at the same point as said guide link and having its other end connected by a second link to the vessel, said toggle and guide linkage adapted upon movement of said lever to withdraw the vessel from contact with the head and to rotate the vessel for discharging its contents.

6. In a device of the class described, a supporting frame, a head fixedly carried by said supporting frame and formed to provide fluid inlet and outlet ducts, a vessel movable to and from said head, said moving means for said vessel including a toggle linkage having one end carried by said support and the other end connected to said vessel and a lever connected to the support end of said linkage to straighten or bend the same, means for controlling the movement of said vessel upon movement of said toggle linkage to cause said vessel upon the bending of said toggle links to move vertically into and out of engagement with said head and to cause said vessel to tilt when free from said head including a guide linkage connected to said support and vessel and tie links connected to said support and vessel.

7. In a device of the class described, a supporting housing, a head member supported by the housing, fluid inlet and outlet ducts formed in said head, valve means for controlling fluid flow through said ducts, control means for said valves, timing and indicating means for said control means supported by the housing, a vessel adapted to receive a material to be treated, and means for moving said vessel into operative relation with said head, and means for tilting said vessel for discharging its contents, said vessel moving means including a toggle linkage connected to said housing and said vessel, a lever for operating said toggle and means for holding said lever in certain predetermined positions comprising a quadrant carried by the housing, said tilting means including a guide linkage connected to the housing and the vessel and operable upon a predetermined movement of said toggle to cause said vessel to be tilted to discharge its contents.

8. In a device of the class described, a support, a head carried by the support, means for supporting said vessel and moving it into and out of connection with said head and for tilting said vessel including toggle linkages pivotally carried by said support and pivotally connected to said vessel on opposite sides, tie links connected to said vessel near the bottom to restrict movement of the bottom of the vessel, guide links for controlling the tilting of said vessel connected to said vessel and to the support and having a hinge connection with each other, one of said links having an arm adapted to engage the other link upon rotation of the links relative to each other to prevent further relative movement.

9. In a device of the class described, a support, a head carried by the support and formed to provide inlet and outlet ducts, a source of steam connected to the inlet duct, and valve means for controlling fluid flow through said ducts, a vessel for receiving a material to be treated by said steam, and means for supporting said vessel and moving it into and out of connection with said head and for tilting said vessel including toggle linkages carried by said support and pivotally connected to said vessel on opposite sides, an operating lever for moving said toggle linkages, means to hold said operating lever in predetermined positions, tie links connected to said vessel near the bottom and to the support to restrict movement of the bottom of the vessel, guide links for controlling the tilting of said vessel connected to said vessel at the point of connection of the vessel to the toggle links and to the support at the point of connection of the tie links and having a hinge connection with each other, and means on one link engageable with the other link to determine the relative movement therebetween.

JOHN MILLS.
CHARLES W. LANG.